(12) United States Patent
Jin et al.

(10) Patent No.: US 7,822,442 B2
(45) Date of Patent: Oct. 26, 2010

(54) METHOD AND SYSTEM FOR PARTITIONING AN ANTENNA ARRAY AND APPLYING MULTIPLE-INPUT-MULTIPLE-OUTPUT AND BEAMFORMING MECHANISMS

(75) Inventors: Hang Jin, Plano, TX (US); John Grabner, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/130,244

(22) Filed: May 30, 2008

(65) Prior Publication Data

US 2008/0225972 A1 Sep. 18, 2008

Related U.S. Application Data

(63) Continuation of application No. 11/316,101, filed on Dec. 21, 2005, now Pat. No. 7,400,907.

(60) Provisional application No. 60/733,837, filed on Nov. 4, 2005, provisional application No. 60/712,631, filed on Aug. 29, 2005.

(51) Int. Cl.
*H04M 1/00* (2006.01)

(52) U.S. Cl. ............... 455/562.1; 455/133; 455/137; 455/101; 455/561; 455/132; 342/373; 342/374

(58) Field of Classification Search .......... 455/69, 455/101, 450, 456
See application file for complete search history.

(56) References Cited

U.S. PATENT DOCUMENTS

| 2003/0190897 | A1 | 10/2003 | Lei et al. |
| 2004/0009755 | A1* | 1/2004 | Yoshida ............ 455/101 |
| 2005/0001765 | A1 | 1/2005 | Ryu et al. |
| 2005/0042988 | A1* | 2/2005 | Hoek et al. ........... 455/69 |
| 2005/0101354 | A1 | 5/2005 | Yang |
| 2006/0109938 | A1* | 5/2006 | Challa et al. ......... 375/347 |

* cited by examiner

*Primary Examiner*—Charles N Appiah
*Assistant Examiner*—Kwasi Karikari

(57) ABSTRACT

A system and method are provided for configuring an antenna array having a predetermined number of antennas. After providing an antenna correlation matrix for all antennas with regard to a mobile terminal, the antenna array is virtually partitioned into two or more sub-arrays based on the antenna correlation matrix such that correlations among antennas within each sub-array are higher than correlations among antennas belonging to different sub-arrays. One or more beamforming weights are generated corresponding to each antenna within the sub-arrays for applying to one or more signals transmitted therefrom, and at least one predetermined multiple-input-multiple-output (MIMO) mechanism is further applied among the sub-arrays by treating each sub-array as a virtual antenna.

23 Claims, 1 Drawing Sheet

METHOD AND SYSTEM FOR PARTITIONING AN ANTENNA ARRAY AND APPLYING MULTIPLE-INPUT-MULTIPLE-OUTPUT AND BEAMFORMING MECHANISMS

CROSS REFERENCE

This application is a continuation of U.S. application Ser. No. 11/316,101 filed Dec. 14, 2007 (the entirety of which is incorporated by reference), which in turn claims the benefits of U.S. Patent Application Ser. No. 60/733,837, which was filed on Nov. 4, 2005 and entitled "Optimized Scheme of Combining Transmit Diversity, Spatial Multiplex And Beamforming for An Antenna Array;" and U.S. Patent Application Ser. No. 60/712,631, which was filed on Aug. 29, 2005 and entitled "Optimized Scheme of Combining Transmit Diversity And Beamforming for An Antenna Array."

FIELD OF THE INVENTION

This invention relates generally to an antenna system, and more particularly to an improved method for combining transmit multi-input-multi-output (MIMO) mechanisms such as transmit diversity or spatial multiplex scheme and beamforming mechanism for an antenna array.

BACKGROUND

In wireless communication systems, adaptive antenna arrays are used for offering significant capacity improvements, especially in an interference-limited environment. See, e.g., J. Liberti, T. Rappaport, "Analytical results for capacity improvements in CDMA," IEEE Transactions on Vehicular Technology, vol. 43, pp. 680-690, 1994, and J. Winters et al., "The impact of antenna diversity on the capacity of wireless communication systems," IEEE Transactions on Communications, vol. 42, pp. 1740-1751, 1994. This technology offers the ability to eliminate same cell interference for mobile stations being served simultaneously. It offers the prospect of a reduction of inter-cell interference. It also increases the signal-to-noise ratio of a particular mobile station being served and therefore enables an increase in user data rate. These benefits and advantages result in either higher data throughput, or the ability to service more mobile stations simultaneously, within a given cell or service infrastructure.

Adaptive antenna array is used to improve the performances of wireless communication systems. There are two types of adaptive antenna array: diversity antenna array and beamforming antenna array. In a diversity antenna array, the data stream are coded in space and time and sent from multiple low-correlated antennas to achieve diversity gain. On the other hand, beamforming array utilizes the spatial directivity and provide beamforming gain. Spatial directivity requires a good correlation among antennas.

The multiple antennas of the array are typically deployed at the base station of each cell, and the signals transmitted or received by the antennas are linearly combined with certain complex weights. Different antenna weights are used to extract the signals transmitted to or received from different mobile stations within the cell. By properly adjusting the antenna weights, the multiple antennas can improve the signal-to-interference ratio (SIR) through beamforming, interference cancellation and receive diversity.

With spatially separated antennas in the antenna array, beamforming becomes practical for both transmit and receive modes. Focusing radiant energy in the direction of a mobile station reduces the amount of overall power needed to be generated by the base station. Antenna array technology can be used to focus power coming from the mobile station to the base station via a reverse link or an uplink, as well as from the base station to the mobile station via a forward link or downlink.

Usually, during transmit mode, a wide transmit beam is desired so that the transmit beam, and its associated pilot, reaches all of the mobiles within the service area or sector, since the base station does not initially know where any particular mobile would be within that area. After a particular mobile station is located within the service area of the base station, narrower transmit beams may be employed to divide and concentrate limited base station power among all of the mobile stations being served simultaneously.

In base station receive mode, very narrow beams are highly desirable in order to provide multiple beam diversities and concentrate the signal energy from a particular one of the mobiles operating within a particular one of the available service channels and to exclude or reduce signal energies from other mobiles within the same service area using other ones of the available service channels. Narrow beamforming creating very narrow beams with high antenna array gains at the base station for both receive and transmit modes typically requires more antenna elements.

In the conventional art, two antenna arrays may be used with each one performing beamforming separately. Then, taking each antenna array as a single antenna independent from the other, a transmit diversity process is performed between these two antenna arrays. An alternative to that is to use one antenna array, but calculate two weights from the uplink signal for the antenna array. These two weights are then applied to the transmit signal to form two transmitted signals, forming two 'virtual antennas'. Transmit diversity will then be implemented for these two 'virtual antennas'.

Transmit beam forming requires a good correlation among antennas to achieve beam forming gain, while transmit diversity scheme requires independent or low correlation among antennas to achieve diversity gain. Apparently, these two requirements, that is, good antenna correlation for beam forming and low antenna correlation for diversity, are contradictive.

Furthermore, the antenna correlation has a dynamic characteristic as it depends on the air channel between the antenna array and the antenna on the mobile terminal that it communicates with. For example, in a case of point-to-multipoint systems (PMP, like cellular), for terminals at locations with line-of-sight or near line-of-sight condition, the base station antennas will have high correlations. On the contrary, if the terminals are located with non-line-of-sight conditions and the channels experience heavy multi-paths, the base station antennas will have no or little correlation.

Conventional methods do not take into account the antenna correlations when combining beamforming and transmit diversity for an antenna array. For example, some conventional methods use two transmitter antenna arrays (or one transmitter antenna array with a fixed sub-array partition). The fixed sub-array partition does not take into account the antenna correlations, and does not change or update over time. Some other conventional methods do not physically partition the antenna array into two sub-arrays. Instead, they use two weights (i.e., beamforming) to form two virtual antennas, and apply diversity between these two virtual antennas. Weights are calculated through covariance matrices. They need beamforming for all antennas and the antenna correlations are not taken into account.

Therefore, there exists a need to provide an improved wireless communications system benefiting simultaneously from both diversity and beamforming gains, taking into account the correlations among antennas.

SUMMARY

A system and method are provided for configuring an antenna array having a predetermined number of antennas. According to one embodiment of the present invention, after providing an antenna correlation matrix for all antennas with regard to a mobile terminal, the antenna array is virtually partitioned into two or more sub-arrays based on the antenna correlation matrix such that correlations among antennas within each sub-array are higher than correlations among antennas belonging to different sub-arrays. One or more beamforming weights are generated corresponding to each antenna within the sub-arrays for applying to one or more signals transmitted therefrom, and at least one predetermined multiple-input-multiple-output (MIMO) mechanism is further applied among the sub-arrays by treating each sub-array as a virtual antenna.

DETAILED DESCRIPTION OF THE INVENTION

Figure 1:
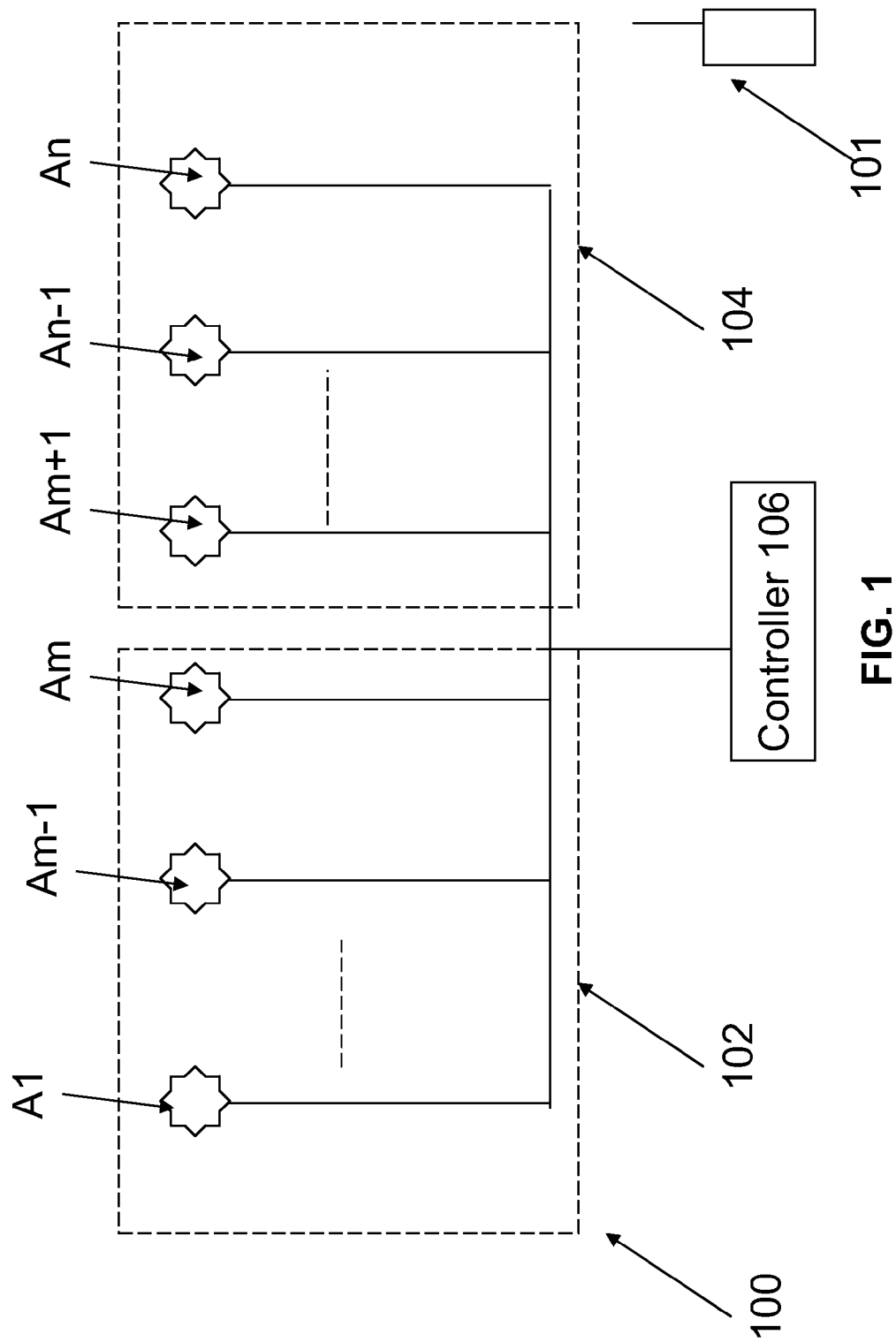
FIG. 1 is a schematic diagram depicting an antenna array system according to one embodiment of the present invention.

Although the present invention is illustrated below with regard to a few limited examples, it is understood that the present invention is applicable to any telecommunication technologies with any multiple access schemes. Such access technologies include Frequency Division Multiple Access (FDMA), Time Division Multiple Access (TDMA), Code Division Multiple Access (CDMA), and Orthogonal Frequency Division Multiplex Multiple Access (OFDM-MA) and any combination thereof, whether synchronized or unsynchronized, using Frequency Division Duplex (FDD) or Time Division Duplex (TDD).

The present disclosure provides an improved wireless communications system benefiting simultaneously from using both diversity and beamforming gains. Furthermore, given an antenna structure, the correlations among antennas are taken into account, and an optimized scheme for combining diversity/spatial multiplexing and beamforming is developed. Therefore, when using beam forming and transmit diversity/spatial multiplexing simultaneously for an antenna array, the optimized scheme is to part the antenna array into two sub-arrays in such a way that, in each sub-array, the antennas have high correlations and the beamforming is used to achieve good beam forming gain, while antennas between the sub-arrays have low correlations and the diversity/spatial multiplexing scheme is used between the sub-arrays (virtual antennas) to achieve good diversity/capacity gain.

FIG. 1 illustrates an antenna array system 100 according to one embodiment of the present invention. It is assumed that the antenna array system 100 has altogether N antennas (A1-Am and Am+1-An), where N>1. The antennas in the array can be omni and directional antenna as long as they can be used for beamforming purposes. The antenna array can be configured to have a circular or linear or any 2D or 3D predetermined arrangements for maximizing the benefits of the present invention. Further, it is understood that the base station communicates with at least one mobile terminal 101, and there is at least one antenna on each mobile terminal. For each antenna of each mobile terminal, the correlation matrix among base station antennas can be calculated. The correlation matrix for one or more antennas provides the antenna correlation information among them. The correlation matrix is given as follows:

$$C = [a_{i,j}] \quad i,j = 1, 2, \ldots N$$

Where $a_{i,j}$ is the correlation coefficient between antenna i and j.

The correlation coefficient $a_{i,j}$ can be derived based on the monitoring of the communication channels between the ith and jth antennas with the mobile terminal. If the uplink and downlink channels are symmetrical (e.g., in time division duplex (TDD) systems), the channel correlation monitoring can be done through the received signals from the uplink channels and coefficient $a_{i,j}$ can be calculated as follows:

$$a_{i,j} = \frac{\hat{s}_i \cdot \hat{s}_j}{\sqrt{E(|\hat{s}_i|^2)} \cdot \sqrt{E(|\hat{s}_j|^2)}} \quad i, j = 1, 2, \ldots N$$

where $\hat{S}_i$ and $\hat{S}_j$ are, respectively, the received uplink signals on antenna i and j from the mobile terminal (zero mean).

If the uplink and downlink channels are not symmetric (e.g., Frequency Division Duplex systems with uplink and downlink bands being largely separated), the antenna correlation can be monitored through feedback signals from the mobile terminal. That is, the mobile terminal observes the downlink signals from all antennas of the antenna array on the base station, and computes the correlation matrix, and then sends it back to the base station so that the base station is informed periodically.

An alternative method to obtain the correlation matrix is through a calibration procedure. In the calibration procedure, a particular mobile terminal is used as a calibrating terminal which transmits a signal with certain Direction of Arrival (DOA) to the antenna array on the base station. The base station then calculates the correlation matrix with this provided DOA. This procedure is repeated with different DOA so that a calibration table is established for linking the DOA to its corresponding correlation matrix. In the use thereafter, once the DOA of the signals is calculated, the corresponding correlation matrix can be searched by looking at the calibration table.

In operation, with regard to a mobile terminal and at a particular time instance, a corresponding correlation matrix is first obtained. Based on this information, the base station antenna array 100 is partitioned into two virtual sub-arrays 102 and 104. The virtual sub-array has antennas A1-Am, and the virtual sub-array has antennas Am+1-An. The artificial partition is done in such a way that the correlations among antennas within each sub-array are much higher than the correlations between any two antennas of the two separate sub-array. In an ideal operation, the correlations among antennas within each sub-array are maximized, while the correlations among antennas of two different sub-arrays are minimized.

As shown in FIG. 1, assuming there are N number of antennas in the antenna array system with one virtual sub-array having antennas A1-Am, and the other sub-array having Am+1-An. The antenna array is further connected to a processing controller 106, where required data processing is done. The controller 106 also serves the function to apply beamforming weights to the antennas as well as implementing the selected MIMO mechanisms. The following parameters can be derived:

$$C_{00} = \sum_{m,n} |a_{m,n}|^2 \quad m, n = 1, 2, \ldots M$$

$$C_{01} = \sum_{m,n} |a_{m,n}|^2 \quad m = 1, 2, \ldots M; n = M+1, M+2, \ldots N$$

-continued $$C_{10} = \sum_{m,n} |a_{m,n}|^2 \quad m = M+1, M+2, \ldots N, n = 1, 2, \ldots M$$

$$C_{11} = \sum_{m,n} |a_{m,n}|^2 \quad m, n = M+1, M+2, \ldots N$$

where $a_{i,j}$ is the correlation coefficient between antenna i and j

The partition for the virtual sub-array can be made in such a way that the C00 and C11 are maximized while C10 and C01 are minimized. Mathematically, this can be done through an optimized procedure, for example, as follows:

$$\underset{\substack{antenna \\ partition}}{\text{MAX}} \left( \frac{C_{00} \cdot C_{11}}{C_{10} \cdot C_{01}} \right)$$

Other conditions can be imposed by including various predetermined parameters in the optimized procedure. For example, one can impose a condition that the total required transmit power should be almost the same for both sub-arrays. For each sub-array, the total required transmit power can be estimated from the received uplink signals on each of its antennas or the received down link powers from each of its antennas. As it is understood, the information on received down link powers can be fed back from the mobile terminal. It is further understood that the partition of virtual sub-arrays does not have to be "optimized" for all conditions. They only need to be optimized under a set of particular conditions.

After the virtual sub-array partition is done through the procedure described above, a beam forming procedure is carried out for antennas within each sub-array so that one or more weights are generated to be applied to the signals communicated by each antenna. Furthermore, a multiple-input-multiple output (MIMO) mechanism (such as a transit diversity scheme or spatial multiplex scheme) is carried out between the sub-arrays with each sub-array being treated as a single "virtual antenna". The weights must be calculated for the beam forming, and they can be obtained through received uplink signals if the down and up links are symmetrical or through the information fed back from the mobile terminals. The transmit diversity scheme can be a simple repeat scheme, or some sophistical space time coding like Alamouti scheme, or other functionally equivalent diversity schemes. The spatial multiplex scheme can be a simple scheme like sending two different data steams from these two virtual antennas, or some other sophistical MIMO schemes that multiplex the data transmission.

The calculations of the beamforming weights and the antenna correlation matrix can be synchronized or asynchronized. If they are synchronized, the calculations are done within the same frame and use the same uplink or feedback data. If they are asynchronized, the data used for the weight calculation may differ from the data used for correlation matrix calculation. For example, for a stationary mobile terminal, the correlation matrix may not change much while the beamforming weights are supposed to change much faster. In this case, the calculation of the correlation matrix may be done off line with data from previous frames, while the weights are calculated with the data of current frame.

Similar to the updated estimate of beamforming weights, the correlation matrix is also mobile terminal-dependent, and needs be updated from time to time. Therefore, as the correlation matrix changes, the antenna array partition is also mobile terminal dependent, and the partition pattern varies with time. Various mechanisms can be used to trigger the correlation matrix update. For example, the update of the correlation matrix can be set with a certain fixed time interval, or triggered by certain predetermined events. For instance, the update can be triggered when the change of the uplink spatial signal is bigger than a certain threshold, or the change of the uplink power is above a threshold. Or, the update can be initiated by specific commands provided by the base station or mobile terminals.

When the correlation matrix is updated, the antenna partition can be done based on the latest correlation matrix. Or, a condition may be imposed to check whether the change of the correlation matrix is significant enough to cause the antenna array system to initiate a new antenna partition process. In this case, the original partition may be kept unchanged if the correlation matrix does not change much. Other conditions may be imposed based on power levels. For example, it may be required that each sub-array has roughly the same level of total power.

Although the above illustration is provided where the antenna array system is partitioned into two sub-arrays, it is understood that the partition can be done to cause more than 2 virtual sub-arrays. For example, one can partition the array into 4 sub-arrays so that the antennas within each sub-array have strong correlations while the antennas between sub-arrays have weak correlations. It does not matter how many sub-arrays are formed, once the antenna array is partitioned, beamforming is carried out for each sub-array so each sub-array will be converted into a "virtual antenna". As described above, an MIMO mechanism such as a transmit diversity or spatial multiplex or combination of both is applied among the newly defined "virtual antennas". It is understood that if the partition results in only one sub-array, the beamforming is carried out, but no MIMO mechanism is needed.

The present invention as described above provides an improved method for utilizing the antenna correlations within an antenna array to direct the antenna partition and then combining beamforming and MIMO mechanisms for such a partitioned antenna array. Moreover, the beamforming and MIMO mechanism can be optimized simultaneously to achieve the best performance result of the antenna array. In addition to the consideration for the antenna correlations, other parameters such as required transmit power level are used to further optimize the result of the beamforming and the MIMO mechanism. It is further noticed that the antenna partition is carried out on a terminal-by-terminal basis and changed dynamically over time while combining beamforming and the MIMO mechanism for providing the best performance of the antenna array.

The above disclosure provides many different embodiments, or examples, for implementing different features of the invention. Also, specific examples of components and processes are described to help clarify the invention. These are, of course, merely examples and are not intended to limit the invention from that described in the claims. It will be understood by those skilled in the art that various changes in form and detail may be made therein without departing from the spirit and scope of the invention.

What is claimed is:

1. An apparatus comprising:
   an antenna array comprised of a plurality of antennas;
   a controller coupled to the antenna array, wherein the controller is configured to:
   generate an antenna correlation matrix identifying antenna correlation information for one or more antennas with regard to a mobile terminal;
   generate and store data that mathematically partitions the antenna array into two or more virtual sub-arrays based on the antenna correlation matrix such that correlations among antennas within each virtual sub-array are higher than correlations among antennas belonging to different virtual sub-arrays;

generate one or more beamforming weights corresponding to each antenna within the virtual sub-arrays for applying to one or more signals to be transmitted therefrom; and apply at least one predetermined multiple-input-multiple-output (MIMO) transmission technique among the virtual sub-arrays by treating each virtual sub-array as a virtual antenna.

2. The apparatus of claim 1, wherein the controller is further configured to apply the beamforming weights to signals to be transmitted from the antennas in accordance with the at least one MIMO transmission technique to each virtual antenna.

3. The apparatus of claim 1, wherein the controller is configured to generate and store data that mathematically partitions the antenna array such that correlations among antennas within each virtual sub-array are maximized and correlations among antennas in different virtual sub-arrays are minimized.

4. The apparatus of claim 1, wherein the controller is configured to dynamically generate the antenna correlation matrix comprising a set of correlation coefficients representing correlation between any two antennas of the antenna array with respect to the mobile terminal to account for changing conditions in an over-the-air channel between the antennas of the antenna array and one or more antennas of the mobile terminal.

5. The apparatus of claim 4, wherein the controller is configured to dynamically generate and store data to mathematically partition the antenna array into virtual sub-arrays based on the dynamically generated antenna correlation matrix such that the virtual sub-arrays change with time according to the changing conditions in the over-the-air channel between the antenna array and one or more antennas of the mobile terminal.

6. The apparatus of claim 4, wherein the controller is configured to dynamically generate the antenna correlation matrix $C=[a_{i,j}]$, $i, j=1, 2, \ldots, N$, where $a_{i,j}$ is the correlation coefficient between antenna i and antenna j of the antenna array by computing $$a_{i,j} = \frac{\hat{S}_i \cdot \hat{S}_j}{\sqrt{E(|\hat{S}_i|^2)} \cdot \sqrt{E(|\hat{S}_j|^2)}} \quad i, j = 1, 2, \ldots N,$$

where $\hat{S}_i$ and $\hat{S}_j$ are received uplink signals on antenna i and antenna j, respectively, from the mobile terminal.

7. The apparatus of claim 1, wherein the controller is configured to generate the antenna correlation matrix based on correlation coefficients received from the mobile terminal.

8. The apparatus of claim 1, wherein the controller is configured to generate and store data that mathematically partitions the antenna array subject to a requirement that a total transmit power of each virtual sub-array is substantially the same.

9. The apparatus of claim 1, wherein the controller is configured to apply the at least one MIMO transmission technique that comprises a transmit diversity scheme.

10. The apparatus of claim 9, wherein the controller is configured to apply a spatial multiplexed scheme by transmitting different data through the virtual sub-arrays.

11. The apparatus of claim 1, wherein the controller is configured to apply a different MIMO transmission technique to each of the virtual sub-arrays.

12. An apparatus comprising:
an antenna array comprised of a plurality of antennas;
a controller coupled to the antenna array, wherein the controller is configured to:

generate an antenna correlation matrix identifying antenna correlation information for one or more antennas with regard to a mobile terminal;

generate and store data that mathematically partitions the antenna array into two or more virtual sub-arrays based on the antenna correlation matrix such that correlations among antennas within each virtual sub-array are different than correlations among antennas belonging to different virtual sub-arrays;

generate one or more beamforming weights corresponding to each antenna within the virtual sub-arrays for applying to one or more signals to be transmitted therefrom; and apply at least one predetermined multiple-input-multiple-output (MIMO) transmission technique among the virtual sub-arrays by treating each virtual sub-array as a virtual antenna.

13. The apparatus of claim 12, wherein the controller is configured to generate and store data that mathematically partitions the antenna array such that correlations among antennas within each virtual sub-array are higher than correlations among antennas belonging to different virtual sub-arrays.

14. The apparatus of claim 12, wherein the controller is configured to generate and store data that mathematically partitions the antenna array such that correlations among antennas within each virtual sub-array are maximized and correlations among antennas in different virtual sub-arrays are minimized.

15. The apparatus of claim 12, wherein the controller is further configured to apply the beamforming weights to signals to be transmitted from the antennas in accordance with the at least one MIMO transmission technique to each virtual antenna.

16. The apparatus of claim 12, wherein the controller is configured to dynamically generate the antenna correlation matrix comprising a set of correlation coefficients representing correlation between any two antennas of the antenna array with respect to the mobile terminal to account for changing conditions in an over-the-air channel between the antennas of the antenna array and one or more antennas of the mobile terminal.

17. The apparatus of claim 16, wherein the controller is configured to dynamically generate and store data to mathematically partition the antenna array into virtual sub-arrays based on the dynamically generated antenna correlation matrix such that the virtual sub-arrays change with time according to the changing conditions in the over-the-air channel between the antenna array and one or more antennas of the mobile terminal.

18. The apparatus of claim 16, wherein the controller is configured to dynamically generate the correlation matrix $C=[a_{i,j}]$, $i, j=1, 2, \ldots, N$ where $a_{i,j}$ is the correlation coefficient between antenna i and antenna j of the antenna array by computing $$a_{i,j} = \frac{\hat{S}_i \cdot \hat{S}_j}{\sqrt{E(|\hat{S}_i|^2)} \cdot \sqrt{E(|\hat{S}_j|^2)}} \quad i, j = 1, 2, \ldots N,$$

where $\hat{S}_i$ and $\hat{S}_j$ are received uplink signals on antenna i and antenna j, respectively, from the mobile terminal.

19. The apparatus of claim 12, wherein the controller is configured to generate the antenna correlation matrix using information derived from direction of arrival of signals received from the mobile terminal.

20. The apparatus of claim 12, wherein the controller is configured to generate the antenna correlation matrix and the beamforming weights based on data contained within the same frame of a signal received from the mobile terminal.

21. The apparatus of claim 12, wherein the controller is configured to generate the antenna correlation matrix and the beamforming weights based on data contained in different frames of signals received from the mobile terminal.

22. The apparatus of claim 6, wherein the antenna array comprises N antennas and wherein the controller is configured to generate and store data for a first virtual sub-array having antennas $A_1$-$A_m$ and a second virtual sub-array having antennas $A_{m+1}$-$A_N$, to compute $$C_{00} = \sum_{m,n} |a_{m,n}|^2 \; m, n = 1, 2, \ldots M$$

$$C_{01} = \sum_{m,n} |a_{m,n}|^2 \; m, = 1, 2, \ldots M; n = M+1, M+2, \ldots N$$

$$C_{10} = \sum_{m,n} |a_{m,n}|^2 \; m, = M+1, M+2, \ldots N, n = 1, 2, \ldots M$$

; and $$C_{10} = \sum_{m,n} |a_{m,n}|^2 \; m, n = M+1, M+2, \ldots N$$

to partition the antenna array such that $C_{00}$ and $C_{11}$ are maximized while $C_{10}$ and $C_{01}$ are minimized.

23. The apparatus of claim 18, wherein the antenna array comprises N antennas and wherein the controller is configured to generate and store data for a first virtual sub-array having antennas $A_1$-$A_m$ and a second virtual sub-array having antennas $A_{m+1}$-$A_N$, to compute $$C_{00} = \sum_{m,n} |a_{m,n}|^2 \; m, n = 1, 2, \ldots M$$

$$C_{01} = \sum_{m,n} |a_{m,n}|^2 \; m, = 1, 2, \ldots M; n = M+1, M+2, \ldots N$$

$$C_{10} = \sum_{m,n} |a_{m,n}|^2 \; m, = M+1, M+2, \ldots N, n = 1, 2, \ldots M$$

; and $$C_{10} = \sum_{m,n} |a_{m,n}|^2 \; m, n = M+1, M+2, \ldots N$$

to partition the antenna array such that $C_{00}$ and $C_{11}$ are maximized while $C_{10}$ and $C_{01}$ are minimized.

\* \* \* \* \*